(12) United States Patent
Kram

(10) Patent No.: US 12,729,963 B2
(45) Date of Patent: Sep. 8, 2026

(54) METHOD FOR DETERMINING A DIRECTION OF TRAVEL AND/OR A CHANGE IN POSITION AND/OR A SPEED OF A DRIVERLESS TRANSPORT VEHICLE, DRIVERLESS TRANSPORT VEHICLE AND DRIVERLESS TRANSPORT SYSTEM

(71) Applicant: Schaeffler Technologies AG & Co. KG, Herzogenaurach (DE)

(72) Inventor: Martin Kram, Gerolzhofen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 60 days.

(21) Appl. No.: 18/280,310

(22) PCT Filed: Feb. 14, 2022

(86) PCT No.: PCT/DE2022/100122
§ 371 (c)(1),
(2) Date: Sep. 5, 2023

(87) PCT Pub. No.: WO2022/184207
PCT Pub. Date: Sep. 9, 2022

(65) Prior Publication Data

US 2024/0068818 A1 Feb. 29, 2024

(30) Foreign Application Priority Data

Mar. 4, 2021 (DE) .................... 10 2021 105 263.7

(51) Int. Cl.
*G01C 21/20* (2006.01)
*G01C 21/36* (2006.01)
(Continued)

(52) U.S. Cl.
CPC ....... *G01C 21/206* (2013.01); *G01C 21/3602* (2013.01); *G05D 1/0253* (2013.01); *G06V 20/56* (2022.01)

(58) Field of Classification Search
CPC .. G01C 21/206; G01C 21/3602; G06V 20/56; G05D 1/0253
See application file for complete search history.

(56) References Cited

U.S. PATENT DOCUMENTS

2014/0046587 A1* 2/2014 Rintanen ................. G01C 3/08 701/469
2015/0225082 A1* 8/2015 Levron ................... B64D 9/00 244/137.1

(Continued)

FOREIGN PATENT DOCUMENTS

CN 101561680 A 10/2009
CN 102854878 A 1/2013

(Continued)

*Primary Examiner* — Scott A Browne
*Assistant Examiner* — Terry C Buse
(74) *Attorney, Agent, or Firm* — Volpe Koenig

(57) ABSTRACT

A method for determining a direction of travel and/or a change in position and/or a speed of a driverless transport vehicle (1), which has an optical sensor (8) directed to a ground (10), on which the driverless transport vehicle (1) is traveling, wherein a) measurement data is acquired by means of the optical sensor (8), and b) the direction of travel of the driverless transport vehicle (1) and/or a change in position and/or a speed of the driverless transport vehicle (1) is/are determined by an evaluation unit (6) in the driverless transport vehicle (1) based on the acquired measurement data. A driverless transport vehicle and a method for operating a driverless transport vehicle are also provided along with a driverless transport system.

15 Claims, 1 Drawing Sheet

(51) Int. Cl.
*G05D 1/00* (2024.01)
*G06V 20/56* (2022.01)

(56) References Cited

U.S. PATENT DOCUMENTS

| | | | | |
|---|---|---|---|---|
| 2017/0166169 | A1* | 6/2017 | Müller | G07C 9/00309 |
| 2018/0052235 | A1* | 2/2018 | Tall | G01C 21/20 |
| 2019/0242976 | A1* | 8/2019 | Grabowski | G01S 7/484 |
| 2020/0180095 | A1* | 6/2020 | Egglestone | B23Q 17/2466 |
| 2020/0225354 | A1* | 7/2020 | Schindler | G01S 17/89 |
| 2021/0405646 | A1 | 12/2021 | Park | |
| 2022/0308580 | A1* | 9/2022 | Eade | B60W 60/00 |
| 2023/0150447 | A1* | 5/2023 | Church | G08G 1/167<br>340/435 |

FOREIGN PATENT DOCUMENTS

| | | | |
|---|---|---|---|
| CN | 107228663 | A | 10/2017 |
| DE | 102019123647 | | 3/2021 |
| EP | 2192384 | | 6/2010 |
| EP | 2677274 | | 12/2013 |
| EP | 2583147 | | 4/2020 |
| EP | 3722912 | A1 | 10/2020 |
| JP | 2011203224 | A | 10/2011 |
| JP | 5637355 | B2 | 12/2014 |
| WO | 2019183393 | | 9/2019 |
| WO | 2021002511 | | 1/2021 |

* cited by examiner

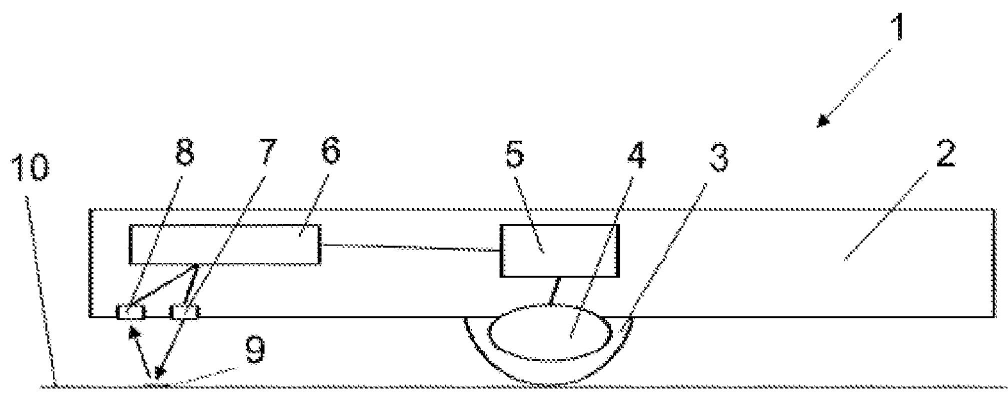
1
10
8
7
6
5
4
3
2
9

METHOD FOR DETERMINING A DIRECTION OF TRAVEL AND/OR A CHANGE IN POSITION AND/OR A SPEED OF A DRIVERLESS TRANSPORT VEHICLE, DRIVERLESS TRANSPORT VEHICLE AND DRIVERLESS TRANSPORT SYSTEM

CROSS-REFERENCE TO RELATED APPLICATION

This application is the U.S. National Phase of PCT Appln. No. PCT/DE2022/100122, filed Feb. 14, 2022, which claims priority from German Patent Application No. 10 2021 105 263.7, filed Mar. 4, 2021, the entire disclosures of which are incorporated by reference herein.

TECHNICAL FIELD

The disclosure relates to a method for determining a direction of travel and/or a change in position and/or a speed of a driverless transport vehicle. Furthermore, the disclosure relates to a method for operating a driverless transport vehicle and a driverless transport vehicle. The disclosure further relates to a driverless transport system with a plurality of driverless transport vehicles.

BACKGROUND

Driverless transport vehicles (DTV, or Automated Guided Vehicles, AGV) are floor-bound conveyors with their own drive, which are automatically controlled and contactlessly guided. Driverless transport vehicles of this type are used as part of driverless transport systems (DTS) for transporting, in particular for pulling or carrying, goods to be conveyed. Driverless transport systems are used, for example, in production and distribution companies for the internal transport of materials and goods.

To determine their position, driverless transport vehicles generally use range finders, which determine the distance of the driverless transport vehicle from predetermined position markers in the area, for example in a warehouse. In addition, measurements from sensors on the drive of the driverless transport vehicle can be used to derive the route traveled and thus the position.

However, deviations occur in the position determination due to various influences, for example slippage of the tires of the transport vehicle or tire wear. These deviations add up over the operating time of the driverless transport vehicle and can take on undesirably high values that make an exact position determination impossible. This makes navigating the driverless transport vehicles more difficult.

SUMMARY

Against this background, the object arises of enabling the position of a driverless transport vehicle to be determined with a lower degree of error.

To achieve the object, a method for determining a direction of travel and/or a change in position and/or a speed of a driverless transport vehicle is proposed, which comprises an optical sensor that is directed towards a ground, on which the driverless transport vehicle travels, wherein a. measurement data are recorded by means of the optical sensor, and b. the direction of travel of the driverless transport vehicle and/or a change in position and/or the speed of the driverless transport vehicle is/are determined by an evaluation unit in the driverless transport vehicle based on the recorded measurement data.

In the method according to the disclosure, an optical sensor is provided as part of the driverless transport vehicle. While the driverless transport vehicle is traveling, the optical sensor records measurement data from the traveled ground. The measurement data are used to determine the direction of travel and/or a change in position and/or the speed of the driverless transport vehicle on the ground. In this way, the method according to the disclosure enables a precise determination of the direction of travel and/or changes in position and/or speed.

The optical sensor is preferably sensitive in the optical range of the electromagnetic spectrum, particularly preferably in the range of infrared radiation and/or in the range of visible light and/or in the range of UV rays. For example, the optical sensor can be sensitive in the near infrared range.

According to an advantageous embodiment, it is provided that the optical sensor comprises a plurality of optically sensitive pixels. Such a configuration of the optical sensor makes it possible to record an image of the ground as a snapshot. The movement of the driverless vehicle can be inferred from the sequence of a plurality of such images at successive points in time, so that it is possible to determine the direction of travel and/or a change in position and/or speed.

In this context it is advantageous if the optical sensor has fewer than 1500 pixels, preferably fewer than 500 pixels, particularly preferably fewer than 300 pixels, for example 256 pixels. Such a configuration can be implemented cost-effectively and can provide a sufficient number of pixels to allow conclusions to be drawn about movements of the driverless vehicle.

According to an advantageous embodiment, it is provided that the ground on which the driverless transport vehicle travels is illuminated with a light source of the driverless transport vehicle. The light source can ensure sufficient illumination of the ground for the recording of the ground by the optical sensor. The light source preferably emits in the optical range of the electromagnetic spectrum, particularly preferably in the range of infrared radiation and/or in the range of visible light and/or in the range of UV rays. For example, the light source can emit in the near infrared range.

In this context, it is preferred if the light source is a light-emitting diode or a laser diode. Light sources of this type require little maintenance and are compact and can be integrated into a driverless transport vehicle at low cost.

According to an advantageous embodiment, it is provided that the measurement data are recorded at periodic intervals with a specified measurement frequency, wherein the specified measurement frequency is in particular in the range of less than 7 kHz, i.e. fewer than 7,000 individual images of the ground are recorded per second. Such sampling rates have proven to be sufficient and also enable a reliable determination of the direction of travel and/or a change in position and/or speed.

The present disclosure also relates to a method for operating a driverless transport vehicle, wherein a controller of the driverless transport vehicle controls a drive motor of the driverless transport vehicle and/or a steering device of the driverless transport vehicle, wherein by means of a method according to one of the preceding claims, a direction of travel and/or a change in position and/or a speed of the driverless transport vehicle is determined and the determined direction of travel and/or change in position and/or speed is supplied to the controller as an actual value.

With the method for operating the driverless transport vehicle, the same advantages can be achieved that have already been described in connection with the method for determining a direction of travel and/or a change in position and/or a speed. The advantageous refinements and features described in connection with the method for determining a direction of travel and/or a change in position and/or speed can also be used alone or in combination in the method for operation.

Another subject matter of the disclosure is a driverless transport vehicle with an optical sensor, which is configured to monitor a ground on which the driverless transport vehicle is traveling, and with an evaluation unit, which is configured to determine the direction of travel of the driverless transport vehicle and/or to determine a change in position and/or the speed of the driverless transport vehicle based on the measurement data recorded by means of the optical sensor.

The driverless transport vehicle can achieve the same advantages that have already been described in connection with the method for determining a direction of travel and/or a change in position and/or a speed of the driverless transport vehicle.

According to an advantageous embodiment of the driverless transport vehicle, it is provided that it comprises a light source that is configured to illuminate the ground being monitored by the optical sensor. The light source is preferably a light-emitting diode or a laser diode.

According to an advantageous embodiment of the driverless transport vehicle, it is provided that it has a drive motor and/or a steering device and comprises a controller which is configured to receive the determined direction of travel and/or change in position and/or the speed supplied by the evaluation unit as an actual value and to control the drive motor and/or the steering device. Such a configuration offers the advantage that precise actual value information on the direction of travel and/or change in position and/or speed can be used in order to be able to compensate for path deviations or to prevent path deviations from occurring.

The advantageous refinements and features described in connection with the method for determining a direction of travel and/or a change in position and/or speed can also be used alone or in combination in the driverless transport vehicle.

Another object of the disclosure is a driverless transport system with a plurality of driverless transport vehicles as described above. As further components, the driverless transport system can comprise a master controller which is connected to the plurality of driverless transport vehicles via a wireless communication link and is configured to control the driverless transport vehicles.

With the driverless transport system, the same advantages can be achieved that have already been described in connection with the method for determining a direction of travel and/or a change in position and/or speed. The advantageous configurations and features described in connection with the method for determining a direction of travel and/or a change in position and/or speed can also be used alone or in combination in the driverless transport system.

BRIEF DESCRIPTION OF THE DRAWINGS

Further details and advantages of the disclosure will be explained below with reference to the exemplary embodiment shown in the drawings. In the FIGURES:

FIG. 1 shows an exemplary embodiment of a driverless transport vehicle in a schematic representation.

DETAILED DESCRIPTION

FIG. 1 shows a schematic representation of a driverless transport vehicle 1. The driverless transport vehicle 1 is configured to transport goods and/or materials. It comprises a vehicle frame 2. An optical sensor 8 is arranged on the driverless transport vehicle 1, in particular on the underside of the vehicle frame 2, which is configured to monitor a ground 10 on which the driverless transport vehicle 1 travels. While the driverless transport vehicle 1 is traveling, measurement data of the ground 10 are recorded by means of the optical sensor and are made available to an evaluation unit 6 of the driverless transport vehicle 1. This evaluation unit 6 is configured to determine the direction of travel of the driverless transport vehicle 1 and/or a change in position and/or the speed of the driverless transport vehicle 1 based on the measurement data recorded by the optical sensor 8.

The optical sensor 8 is sensitive in the optical range of the electromagnetic spectrum, for example in the range of infrared radiation, in particular near-infrared radiation, and/or in the range of visible light and/or in the range of UV rays.

The optical sensor 8 can comprise a plurality of optically sensitive pixels, for example 4×4, 8×8, 16×16 or 32×32 pixels, so that an image of the ground can be recorded. The measurement data can be recorded at periodic intervals with a specified measurement frequency, wherein the specified measurement frequency is in particular in the range of less than 7 kHz, i.e. fewer than 7,000 individual images of the ground are recorded per second.

In order to improve the quality of the measurement data recorded by the optical sensor 8, a light source 7 is preferably arranged on the driverless transport vehicle 1, in particular on the underside of the vehicle frame 2. The light source 7 is preferably aligned in such a way that the area 9 of the ground that is recorded by the optical sensor 8 is illuminated.

The light source 7 preferably emits in the optical range of the electromagnetic spectrum, particularly preferably in the range of infrared radiation and/or in the range of visible light and/or in the range of UV rays. For example, the light source 7 can emit in the near infrared range.

With the driverless transport vehicle 1, a method for determining the direction of travel and/or a change in position and/or speed of vehicle 1 can be used, in which measurement data are recorded by means of the optical sensor 8, and the direction of travel is determined and/or a change in position and/or the speed of the driverless transport vehicle 1 is determined based on the recorded measurement data in the evaluation unit 6 of the driverless transport vehicle 1. With this method, measurement data—an image—of the ground can be recorded at any time on grounds with different materials and/or properties. The optical sensor 8 can make this image electrically processable and make it available to the evaluation unit 6. The evaluation unit 6 can determine the direction of travel and/or a change in position and/or a speed based on the measurement data, in particular a sequence of measurement data following one another in time.

The determined direction of travel and/or change in position and/or speed can be transmitted to a controller 5 of the driverless transport vehicle 1. The controller 5 can read this information as actual values and use it to control a drive motor, for example a wheel drive 4 for a wheel 3 of the driverless transport vehicle 1.

The driverless transport vehicle 1 described above can be used as part of a driverless transport system consisting of a plurality of driverless transport vehicles. The driverless transport vehicles may be controlled by a master controller that is in communication with the plurality of driverless transport vehicles via a wireless communication link, and which is configured to control said driverless transport vehicles.

LIST OF REFERENCE SYMBOLS

1 Driverless transport vehicle
2 Vehicle frame
3 Wheel
4 Wheel drive
5 Controller
6 Evaluation unit
7 Light source
8 Optical sensor
9 Ground area recorded
10 Ground

The invention claimed is:

1. A method for controlling a driverless transport vehicle, the method comprising:

providing an optical sensor on an underside of a vehicle frame of the driverless transport vehicle, wherein the optical sensor is directed towards a ground region on which the driverless transport vehicle travels, and wherein the optical sensor has fewer than 500 pixels;

illuminating the ground on which the driverless transport vehicle travels with a light source of the driverless transport vehicle, wherein the light source is disposed adjacent the optical sensor and emits in a near-infrared range, such that the ground region in which the optical sensor is directed is illuminated by the light source;

recording measurement data utilizing the optical sensor, wherein the measurement data comprises a plurality of images of the illuminated ground region;

comparing a sequence of the measurement data following one another in time;

determining at least one of a direction of travel, a change in position, or a speed of the driverless transport vehicle via an evaluation unit in the driverless transport vehicle based on the recorded and compared measurement data; and controlling at least one of a drive motor or a steering device of the driverless transport vehicle using a controller of the driverless transport vehicle, and at least one of the direction of travel, the change in position, or the speed of the driverless transport vehicle is determined and supplied to the controller as an actual value based on the recorded and compared measurement data.

2. The method according to claim 1, wherein the light source comprises a light-emitting diode or a laser diode.

3. The method according to claim 1, wherein the measurement data is recorded at periodic intervals with a specified measurement frequency, and the specified measurement frequency is less than 7 kHz.

4. The method according to claim 1, wherein the optical sensor has fewer than 500 total pixels.

5. The method according to claim 1, wherein the optical sensor comprises a plurality of optically sensitive pixels in an array of 16×16 pixels.

6. A driverless transport vehicle, comprising:

a vehicle frame;

an optical sensor coupled to an underside of the vehicle frame, the optical sensor being directed towards and configured to monitor a ground region on which the driverless transport vehicle travels, wherein the optical sensor comprises a plurality of optically sensitive pixels, and the optical sensor comprises fewer than 500 optically sensitive pixels;

a light source disposed adjacent the optical sensor and emitting in a near-infrared range, such that the light source is configured to illuminate a portion of the ground region monitored by the optical sensor, wherein the optical sensor is configured to record measurement data of the illuminated ground region and transmit the measurement data to an evaluation unit;

the evaluation unit is configured to determine at least one of a direction of travel, a change in position, or a speed of the driverless transport vehicle based on the measurement data recorded by the optical sensor; and a controller that is configured to control at least one of a drive motor or a steering device of the driverless transport vehicle, wherein the controller is configured to receive the at least one of the determined direction of travel, the change in position, and the speed supplied by the evaluation unit as an actual value and to control the at least one of the drive motor or the steering device.

7. A driverless transport system comprising a plurality of the driverless transport vehicles according to claim 6.

8. The driverless transport vehicle according to claim 6, wherein the optical sensor has fewer than 500 total optically sensitive pixels.

9. The driverless transport vehicle according to claim 6, wherein the plurality of optically sensitive pixels are in an array of 16×16 pixels.

10. A method for controlling a driverless transport vehicle, the method comprising:

providing an optical sensor on an underside of a vehicle frame of the driverless transport vehicle, wherein the optical sensor is directed towards a ground region on which the driverless transport vehicle travels, and wherein the optical sensor comprises a plurality of optically sensitive pixels, and the optical sensor comprises fewer than 500 optically sensitive pixels;

illuminating the ground on which the driverless transport vehicle travels with a light source of the driverless transport vehicle, wherein the light source is disposed adjacent the optical sensor and emits in a near-infrared range, such that the ground region in which the optical sensor is directed is illuminated by the light source;

recording measurement data using the optical sensor, wherein the measurement data comprises a plurality of images of the illuminated ground region;

transmitting the measurement data to an evaluation unit in the driverless transport vehicle;

comparing a sequence of the measurement data following one another in time;

determining at least one of a direction of travel, a change in position, or a speed of the driverless transport vehicle using the recorded, transmitted, and compared measurement data; and controlling at least one of a drive motor or a steering device of the driverless transport vehicle using a controller of the driverless transport vehicle, and at least one of the direction of travel, the change in position, or the speed of the driverless transport vehicle is determined and supplied to the controller as an actual value based on the recorded, transmitted, and compared measurement data.

11. The method according to claim 10, wherein the light source comprises a light-emitting diode or a laser diode.

12. The method according to claim 10, wherein the measurement data is recorded at periodic intervals with a specified measurement frequency, and the specified measurement frequency is less than 7 kHz.

13. The method according to claim 10, wherein the optical sensor has fewer than 500 total optically sensitive pixels.

14. The method according to claim 10, wherein the optical sensor has fewer than 256 pixels.

15. The method according to claim 10, wherein the plurality of optically sensitive pixels are in an array of 16×16 pixels.

* * * * *